(12) United States Patent
Seppmann (10) Patent No.: US 8,281,806 B2
(45) Date of Patent: Oct. 9, 2012

(54) CHECK VALVE

(75) Inventor: Corey J Seppmann, Mankato, MN (US)

(73) Assignee: Seppmann Enterprises, LLC, Mankato, MN (US)

( * ) Notice: Subject to any disclaimer, the term of this patent is extended or adjusted under 35 U.S.C. 154(b) by 1170 days.

(21) Appl. No.: 12/042,075

(22) Filed: Mar. 4, 2008

(65) Prior Publication Data

US 2009/0223576 A1    Sep. 10, 2009

(51) Int. Cl.
*F16K 15/18* (2006.01)
(52) U.S. Cl. .................. 137/523; 251/83; 251/149.6
(58) Field of Classification Search .............. 137/523; 251/149.6, 83; 285/148.19, 148.23
See application file for complete search history.

(56) References Cited

U.S. PATENT DOCUMENTS

| | | | | |
|---|---|---|---|---|
| 675,320 A * | 5/1901 | Boyne | | 285/32 |
| 2,265,267 A * | 12/1941 | Cowles | | 251/149.6 |
| 2,865,398 A * | 12/1958 | Popovich | | 137/539 |
| 3,129,919 A * | 4/1964 | Evans | | 251/89.5 |
| 4,351,355 A * | 9/1982 | Koller et al. | | 137/329.06 |
| 2004/0238777 A1 * | 12/2004 | Yang | | 251/149.6 |

* cited by examiner

*Primary Examiner* — Kevin Lee
*Assistant Examiner* — Macade Brown
(74) *Attorney, Agent, or Firm* — Leffert Jay & Polglaze, P.A.

(57) ABSTRACT

A nipple of a check has a first portion that is selectively positionable within a housing of the check valve. A second portion of the nipple extends from the housing when the first portion of the nipple is selectively positioned within the housing. The check valve is configured to allow fluid flow through the check valve in either a first direction or a second direction when the first portion of the nipple is selectively positioned within the housing. The check valve is configured to prevent fluid flow through the check valve in the first direction when the first portion of the nipple is removed from the housing.

25 Claims, 5 Drawing Sheets

CHECK VALVE

FIELD

The present disclosure relates generally to valves and in particular the present disclosure relates to check valves.

BACKGROUND

Fluid-handling systems, such as water-handling systems, hydrant systems, e.g., fire-hydrant systems, etc., often include several branches coupled to a main fluid supply. Problems with such systems can occur when one of the branches needs to be shut down, e.g., for servicing that branch, in that the main fluid supply may have to be turned off, preventing the supply of fluid to all the branches. This problem is exacerbated for fire-hydrant systems in that the supply of water to several fire hydrants may be turned off for the sake of servicing single fire hydrant, for example. Because of the problems associated with turning off the fluid to several branches for the sake of servicing a single branch, valves, such as ball valves, are sometimes installed in each branch so that each branch can be shut down individually without shutting down the remaining branches. However, problems may occur for subterranean fluid-handling systems with a subterranean valve for one or more branches, for example, in that digging through the ground is required in order to gain access to a subterranean valve for shutting down the branch corresponding to that subterranean valve.

For the reasons stated above, and for other reasons stated below which will become apparent to those skilled in the art upon reading and understanding the present specification, there is a need in the art for alternative valves.

SUMMARY

An embodiment of the disclosure provides check valve. A nipple of the check has a first portion that is selectively positionable within a housing of the check valve. A second portion of the nipple extends from the housing when the first portion of the nipple is selectively positioned within the housing. The check valve is configured to allow fluid flow through the check valve in either a first direction or a second direction when the first portion of the nipple is selectively positioned within the housing. The check valve is configured to prevent fluid flow through the check valve in the first direction when the first portion of the nipple is removed from the housing.

DETAILED DESCRIPTION

In the following detailed description, reference is made to the accompanying drawings that form a part hereof, and in which is shown, by way of illustration, specific embodiments in which the invention may be practiced. In the drawings, like numerals describe substantially similar components throughout the several views. These embodiments are described in sufficient detail to enable those skilled in the art to practice the invention. Other embodiments may be utilized and structural, logical, and electrical changes may be made without departing from the scope of the present disclosure. The following detailed description is, therefore, not to be taken in a limiting sense, and the scope of the present disclosure is defined only by the appended claims and equivalents thereof.

Figure 1:
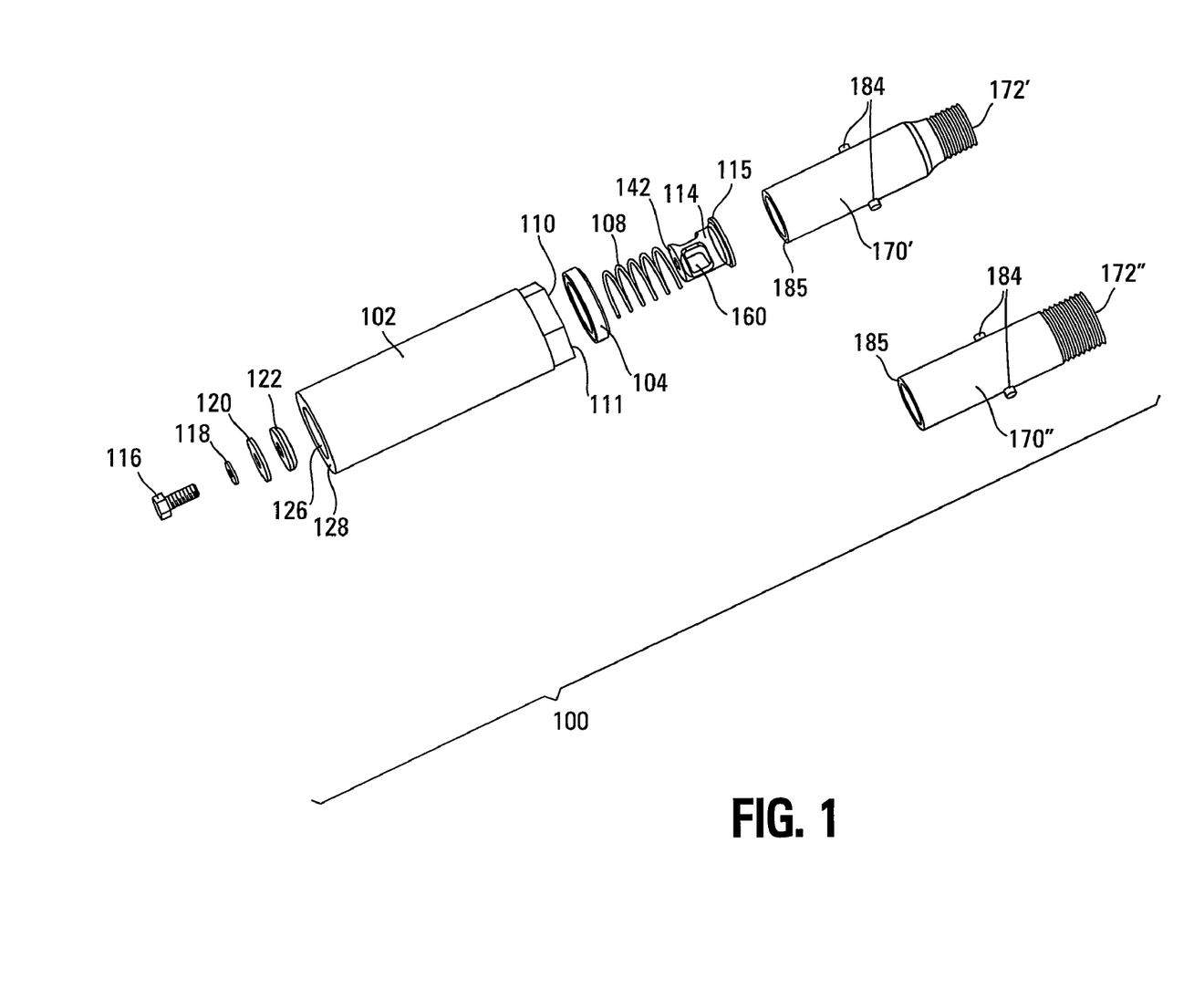
FIG. 1 is an exploded view of an embodiment of a check valve, according to an embodiment of the disclosure.
Figure 2:
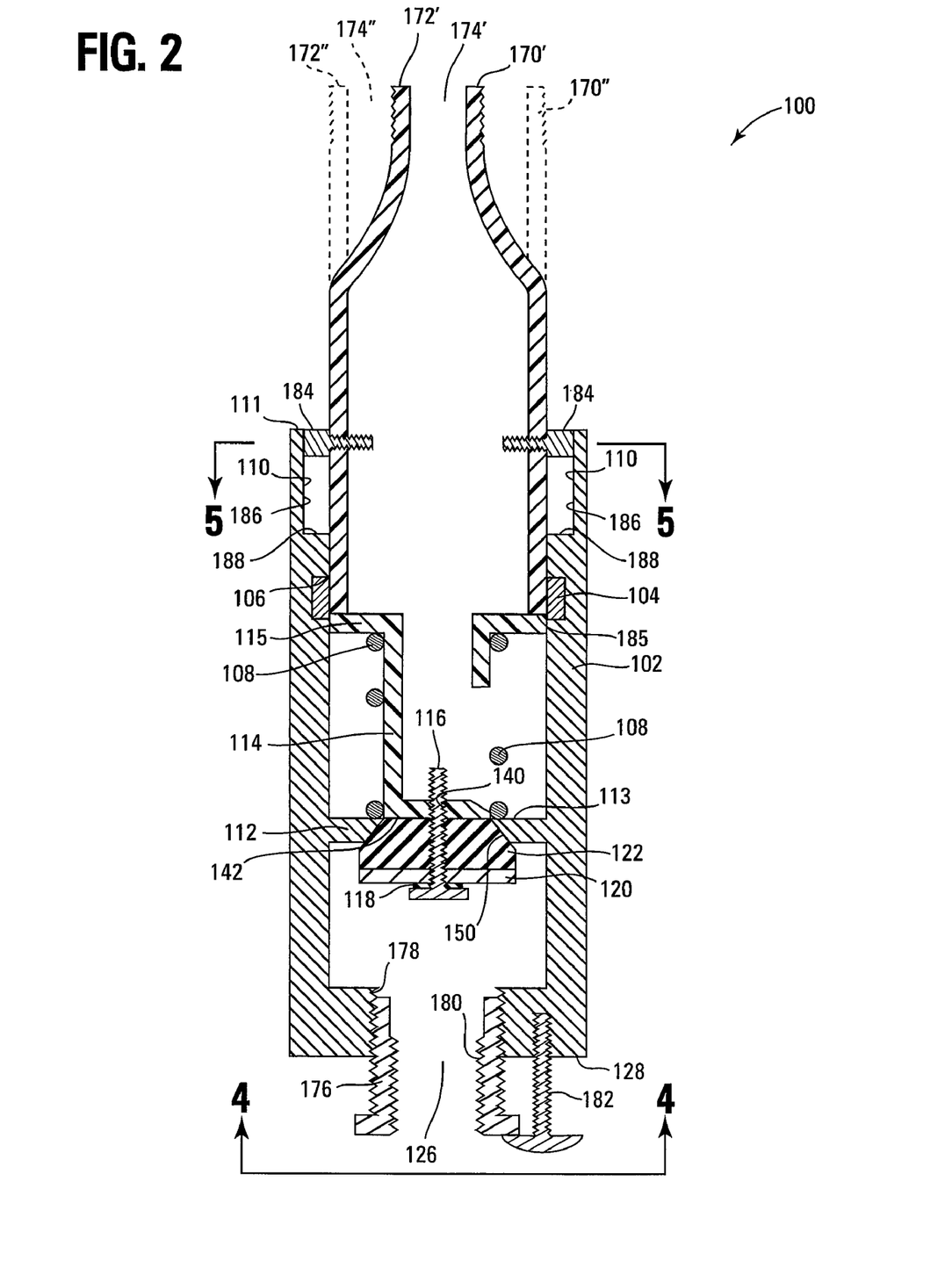
FIG. 2 is a cross section of an embodiment of a check valve in a CLOSED configuration, according to another embodiment of the disclosure.
Figure 3:
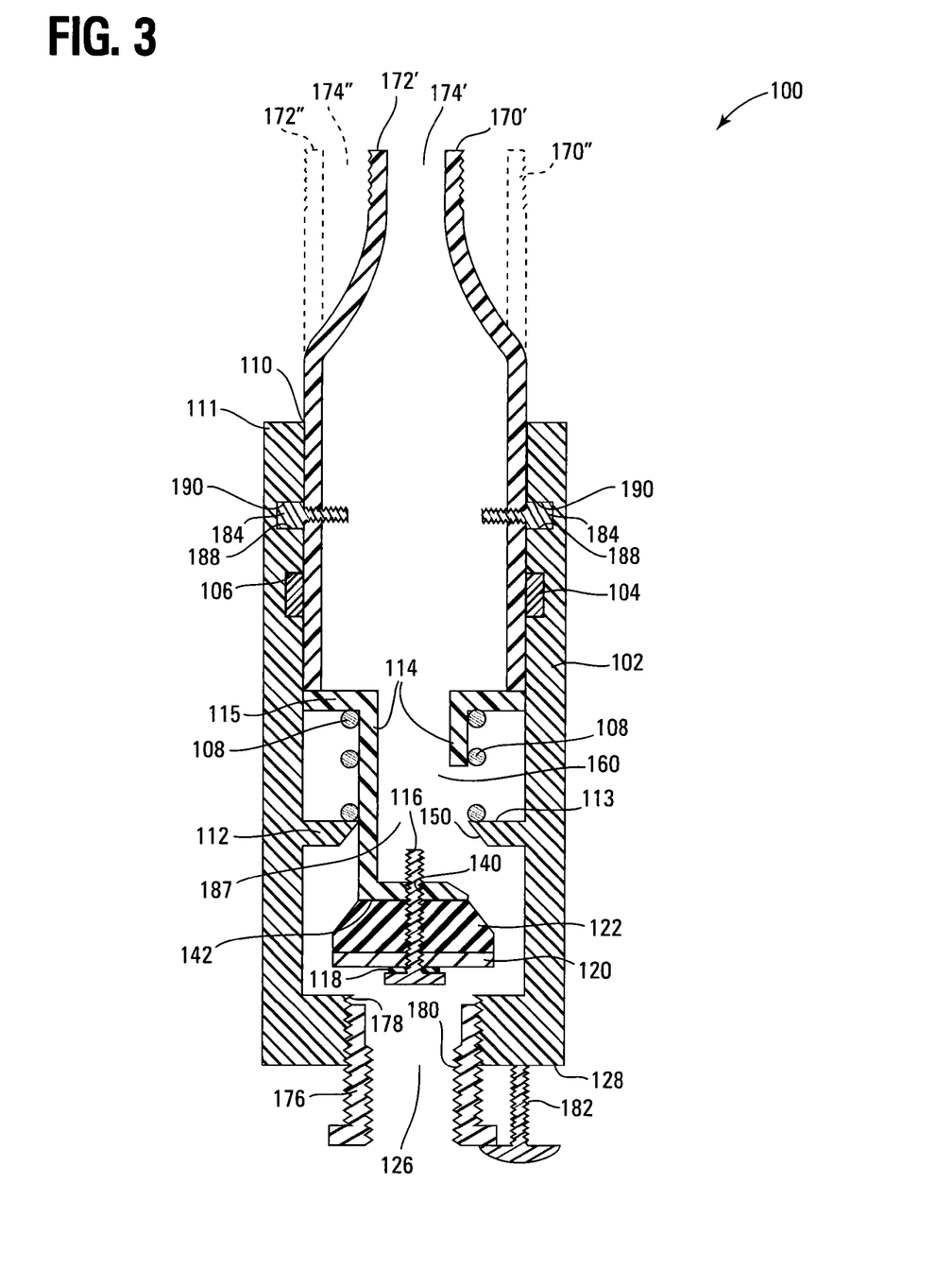
FIG. 3 is a cross section of an embodiment of a check valve in an OPEN configuration, according to another embodiment of the disclosure.

FIG. 1 is an exploded view of a check valve 100, according to an embodiment. FIG. 2 is a cross-sectional view of check valve 100 in a CLOSED configuration thereof, according to another embodiment. FIG. 3 is a cross-sectional view of check valve 100 in an OPEN configuration thereof, according to another embodiment.

Check valve 100 has a housing 102, e.g., of brass. A seal 104 is disposed in a groove 106 that is formed in an interior wall of housing 102, as shown in FIGS. 2 and 3. A biasing device, such as a coil spring 108, e.g., of stainless steel, is inserted through an opening 110 in an end 111 of housing 102 so that an end of spring 108 abuts an upper surface 113 of a seat 112, extending from the interior wall of housing 102, as shown in FIGS. 2 and 3. A cage-like structure, hereinafter referred to as cage 114, is inserted into a bore of spring 108 so that the coils of spring 108 surround the sides cage 114, and an underside of a head 115 abuts an opposite end of spring 108 so that coil spring is interposed between surface 113 of a seat 112 and the underside of head 115 of cage 114, as shown in FIGS. 2 and 3.

A fastener, such as a cap screw 116, e.g., of stainless steel, is passed through a washer 118, e.g., of rubber, a washer 120, e.g., of metal, such as stainless steel, and a seal 122, e.g., of rubber, as shown in FIGS. 1-3. After cap screw 116 is passed through washer 118, washer 120, and seal 122, cap screw 116 is inserted into the interior of housing 102 through an opening 126 in an end 128 of housing 102 and is threaded into a threaded hole 140 in an end 142 of cage 114 that is located opposite to head 115, as shown in FIGS. 2 and 3. Threading cap screw 116 into threaded hole 140 of cage 114 acts to compress spring 108 between surface 113 of seat 112 and the underside of head 115 of cage 114 and to compress washer 118, washer 120, and seal 122 between the head of cap screw 116 and end 142 of cage 114, as shown in FIGS. 2 and 3. When spring 108 is compressed between surface 113 of seat 112 and head 115 of cage 114 and washer 118, washer 120, and seal 122 are compressed between the head of cap screw 116 and end 142 of cage 114, spring 108 biases seal 122 in sealing contact with seat 112. For example, for one embodiment, a tapered portion of seal 122 may be biased into sealing contact with a tapered surface 150 of seat 112, as shown in FIG. 2.

Biasing seal 122 into sealing contact with seat 112 acts to close check valve 100 and thus defines the CLOSED configuration of check valve 100. That is, biasing seal 122 in sealing contact with seat 112 prevents fluid flow, e.g., water flow, through check valve 100 in a direction from end 128 to end 111. In this way, check valve 100 operates as a shut-off valve with respect flow in the direction from end 128 to end 111 by capitalizing on the fact that check valve 100 prevents flow in the direction from end 128 to end 111.

When check valve is in its CLOSED configuration, and if end 111 is pressurized above end 128 to produce a pressure differential between end 111 and 128 that exceeds the biasing force on seal 122, produced by spring 108, cage 114 compresses spring 108 and moves to the open position shown in FIG. 3 so that fluid can flow from end 111, through openings 160 in cage 114, through an opening 187 that passes through the center of seat 112, and through end 128 in response to the pressure differential. However, check valve 100 is not intended to operate in this manner. Instead, a nipple 170, e.g., a either nipple 170' or 170", is inserted through the opening 110 in end 111 in order to lock check valve 100 in its OPEN configuration, as shown in FIG. 3, so that when check valve 100 is pressurized with the pressure at end 128 exceeding the pressure at end 172' of nipple 170' or at end 172" of nipple 170", the flow direction is from end 128 to end 172' or to end 172". That is, the flow enters through opening 126, e.g., functioning as an inlet of check valve 100, flows the opening 187 in seat 112 and through openings 160 in cage 114, and flows through opening 174' of nipple 170' or through opening 174" of nipple 170" (FIG. 3), e.g., opening 174' or opening 174" functioning as an outlet of check valve 100.

Note that a nipple 170 acts to override the unidirectional check-valve functionality of check valve 100 by allowing flow through check valve 100 in either direction, e.g., either from end 128 to end 172' or to end 172" or from end 172' or end 172" to end 128. However, for one embodiment, the flow direction is from end 128 to end 172' or to end 172" when check valve 100 is in operation in its OPEN configuration.

The inner and outer diameter of nipple 170" is substantially uniform along a length of nipple 170", as shown in FIGS. 1-3, e.g., nipple 170" may be the size of a one-inch pipe. For one embodiment, nipple 170" is externally threaded adjacent its end 172", e.g., with one-inch national pipe thread (NPT). Nipple 170' is a reducing nipple in that it transitions from one pipe size to another along its length, e.g., from the size of a one-inch pipe to the size of a ¾-inch pipe. For one embodiment, nipple 170' is externally threaded adjacent its end 172', e.g., with ¾-inch NPT.

For one embodiment, nipple 170' is used in conjunction with a reducing bushing 176, e.g., ¾-inch NPT by one-inch NPT, as shown in FIGS. 2 and 3. Reducing bushing 176 may be threaded into a threaded opening 178 at end 128 of housing 102 to reduce threaded opening 178 to threaded opening 180, where the internal threads of threaded opening 180 match the external threads of nipple 170'. For example, threaded opening 178 may have one-inch NPT threads, and threaded opening 180 may have ¾-inch NPT threads.

For one embodiment, threaded opening 178 may be used in conjunction with nipple 170" or nipple 170' and threaded opening 180 may be used in conjunction with nipple 170" or nipple 170'. For another embodiment, threaded opening 178 may be used in conjunction with nipple 170", where the internal threads of threaded opening 178 match the external threads of nipple 170". Note that using nipple 170' in conjunction with reducing bushing 176 configures check valve 100 for use with fluid-handling components, e.g., valves, piping, hydrants, etc., having a first size, e.g., ¾-inch fluid-handling components, and using nipple 170" without bushing 176 configures check valve 100 for use with fluid-handling components having a second size, e.g., one-inch fluid-handling components. In this way, check valve 100 is selectively configurable between two different sizes, according to another embodiment.

Figure 4:
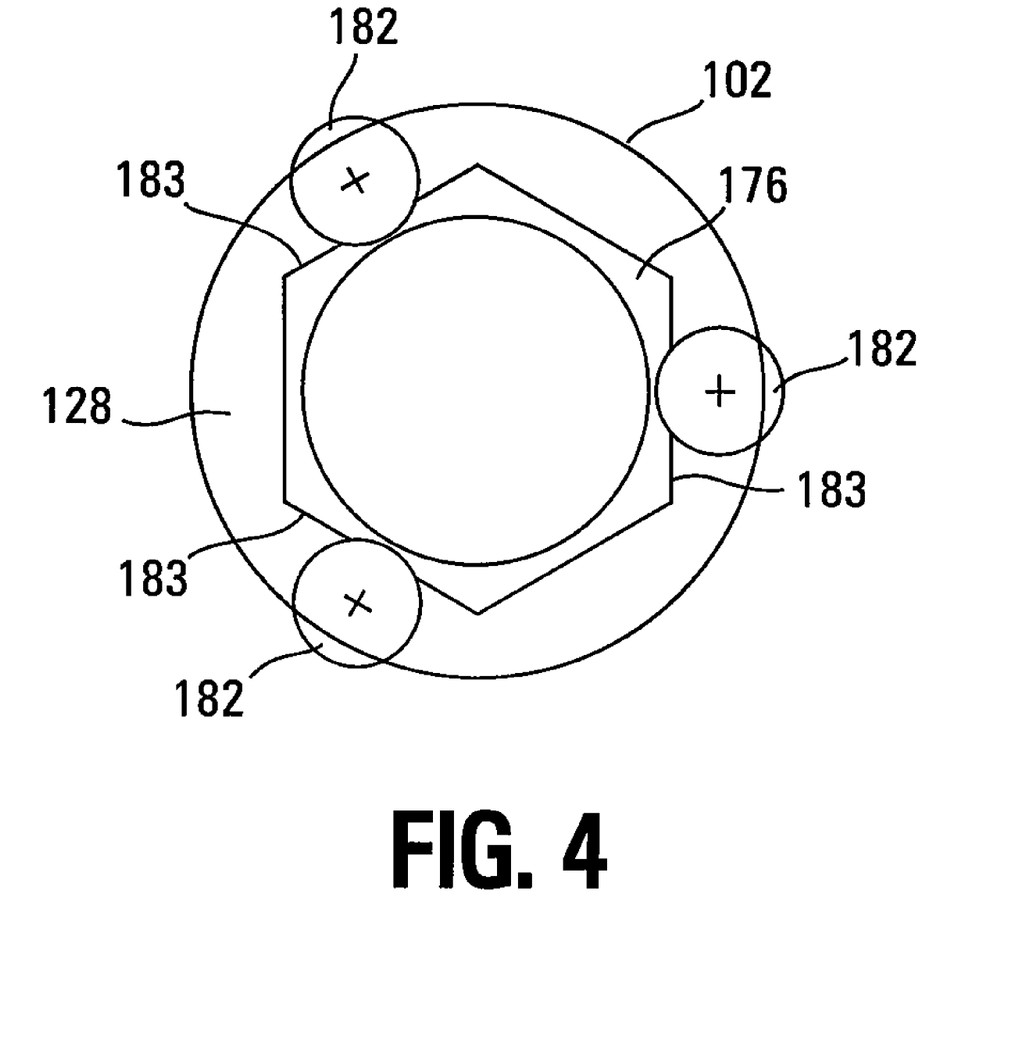
FIG. 4 is a bottom view taken along line 4-4 of FIG. 2, according to another embodiment of the disclosure.

For one embodiment, one or more fasteners, e.g., one or more cap screws 182, may be used to secure bushing 176 in place, e.g., to prevent bushing 176 from unthreading from threaded opening 178 when bushing 176, and thus check valve 100, is unthreaded from a fluid-handling component that is threaded into threaded opening 180 of bushing 176. For example, the one or more cap screws 182 may be threaded into end 128 until a head of each of the cap screws 182 bears against bushing 176, as shown in FIGS. 2 and 3 and in FIG. 4, a bottom view taken along line 4-4 of FIG. 2. As shown in FIG. 4, for one embodiment, three cap screws may be located at different angular locations (e.g., 120-degree intervals) around bushing 176 that respectively correspond to flats 183 of a hexagonal head of bushing 176.

A nipple 170, e.g., either nipple 170' or 170", locks check valve 100 in its OPEN configuration when check valve 100 is connected for operation within a fluid-handling system. For example, check valve 100 may be threadably connected to fluid-handling components located upstream of check valve 100 by threaded opening 178 or 180 and to fluid-handling components located downstream of check valve 100 by the external threads of either nipple 170' or 170". A nipple 170 may also be used to place check valve 100 in its CLOSED configuration from its OPEN configuration and to place check valve 100 in its OPEN configuration from its CLOSED configuration. Note that for one embodiment, check valve 100 is in its OPEN configuration and is pressurized so that the flow direction from end 128 to end 172' or to end 172", during operation, and placing check valve 100 in its CLOSED configuration removes check valve 100 from operation.

A nipple 170, e.g., either nipple 170' or 170", is inserted axially into housing 102 through opening 110 at end 111 of housing 102, e.g., by sliding the nipple 170 through opening 110 relative to housing 102. For example, an end 185 of a nipple 170 is inserted into opening 110 so that pins 184 that protrude radially from an exterior side surface of the nipple 170 (FIGS. 1-3 and FIG. 5, a top view taken along line 5-5 of FIG. 3) are aligned with slots 186 that extend radially from opening 110 (FIG. 2 and FIG. 5) and that extend axially into housing 102 from end 111. Note that for one embodiment, pins 184 protrude from nipple 170 in diametrically opposite directions and that slots 186 extend from opening 110 in diametrically opposite directions. For another embodiment, pins 184 may be secured to the exterior of a nipple 170 by threading the pins 184 through the wall of a nipple 170, as shown in FIGS. 2-3.

As the insertion of nipple 170 proceeds, nipple 170 moves axially into housing 102; pins 184 are received in slots 186 (FIGS. 2 and 5); end 185 engages an upper surface of head 115 of cage 114; and the exterior side surface of nipple 170 is in sealing engagement with seal 104, as shown in FIG. 2.

After engaging the upper surface of cage 114, nipple 170 pushes cage 114 through the opening 187 that passes through the center of seat 112, as shown in FIG. 3. Pushing cage 114 through an opening 187 acts to compress spring 108 between the underside of head 115 and the upper surface 113 of seat 112, as shown in FIG. 3. Insertion of nipple 170 continues until pins 184 engage a bottom 188 of slots 186, which acts to prevent further axial insertion of nipple 170.

Figure 5:
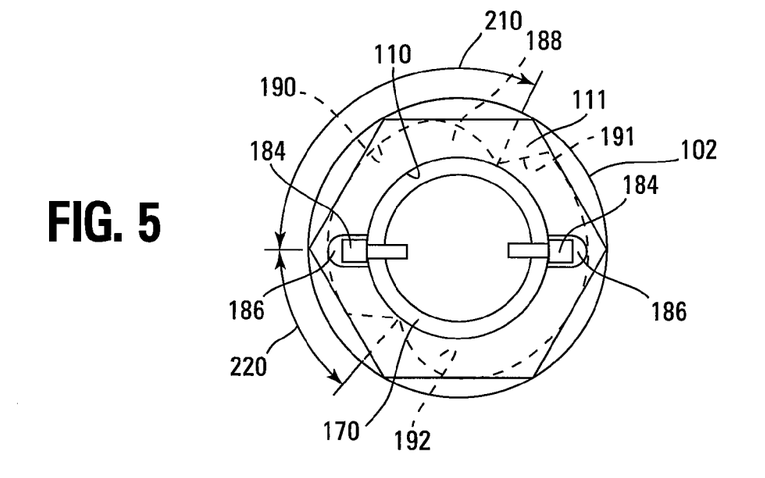
FIG. 5 is a top view taken along line 5-5 of FIG. 2, according to another embodiment of the disclosure.

Slots 186 are in communication with (e.g., open into) a circumferential groove 190 formed in the interior of housing 102 below the surface of end 111, as shown in FIG. 3, and bottom 188 of slots 186 forms a portion of a bottom axial boundary of circumferential groove 190. In addition, groove 190 is shown by a dashed line in the top view of FIG. 5 in that groove 190 is hidden from view by the surface of end 111 in FIG. 5. For one embodiment, stops 191 and 192 extend into groove 190 from the interior of housing 102, as shown in FIG. 5, with stop 191 located at an angular distance 210 in the clockwise direction along the circumference of groove 190 from one of the slots 186 and stop 192 located at an angular distance 220 in the counterclockwise direction along the circumference of groove 190. Note that for one embodiment, angular distance 210 is greater in magnitude than angular distance 220, as shown in FIG. 5.

Figure 6:
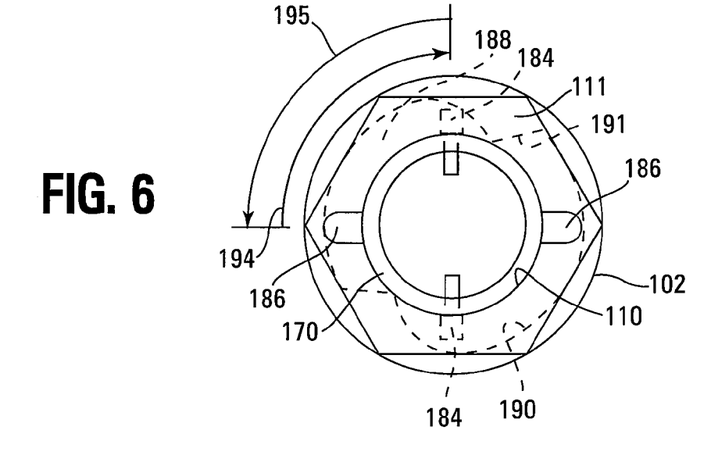
FIG. 6 is top view, corresponding to the top view of FIG. 5, illustrating a rotation of a nipple of a check valve in a first direction, according to another embodiment of the disclosure.

After pins 184 engage bottom 188, nipple 170 is rotated with respect to housing 102, e.g., in a clockwise angular direction within opening 110, as indicated by arrow 194 in the top view of FIG. 6, which corresponds to the top view of FIG. 5. Rotating nipple 170 causes pins 184 to move, e.g., slide, within groove 190 relative to housing 102 until at least one of pins 184 engages a stop, e.g., stop 191, as shown in FIG. 6, thereby preventing further rotation in the angular direction indicated by arrow 194. Note that pins are shown by dashed lines in FIG. 6 to indicate that pins 184 are contained within groove 190, below the surface of end 111 (FIG. 3).

When pins 184 are rotated to the position shown in FIG. 6, pins 188 are contained within groove 190, thus preventing any further axial motion of nipple 170. This prevents compressed spring 108 (FIG. 3) from pushing nipple 170 from housing 102 and thereby locks check valve in its OPEN configuration. That is, in the configuration shown in FIG. 3, spring 108 exerts an axial force on the head of cage 114, and thus onto nipple 170 and pins 184, which in turn direct the force onto the upper axial boundary of groove 190, which resists the force and locks nipple 170, cage 114, and seal 122 in the position shown. In other words, pins 184 are biased against the upper boundary of groove 190 by spring 108 and prevent seal 122 from sealing against seat 112.

With cage 114 locked in the position shown in FIG. 3, fluid can pass through check valve 100 in either direction via openings 160 in cage 114 and the opening 187 that passes through the center of seat 112. In one embodiment, check valve is pressurized such that fluid flow is from opening 126 in end 128 of housing 102 to opening 174' of nipple 170' or opening 174" of nipple 170". That is, when check valve 100 is locked in its OPEN configuration, check valve 100 fluidly couples opening 126 and thus any fluid-handling components upstream of opening 126 to opening 174' or opening 174" and thus to any fluid-handling components downstream of opening 174' or opening 174".

Note that in the OPEN configuration of FIG. 3, seal 104 sealing engages the exterior side surface of a nipple 170 to prevent fluid from leaking between the exterior surface of a nipple 170 and the interior of housing 102. Note that installing a nipple 170 into housing 102, as just described, sets check valve 100 in its OPEN configuration, where presence of nipple 170 acts to override the unidirectional functionality of check valve 100 by preventing seal 122 from sealing against seat 112. That is, when the nipple 170 is positioned in the position shown in FIGS. 3 and 6, check valve 100 is configured in its OPEN configuration.

To close check valve 100, i.e., to restore check valve 100 to its CLOSED configuration, e.g., to restore check valve 100 to its unidirectional functionality, from its OPEN configuration, a nipple 170 is rotated relative to housing 102, e.g., in a counterclockwise angular direction within opening 110, as indicated by arrow 195 in FIG. 6, causing pins 184 to move within groove 190 relative to housing 102. Nipple 170 is rotated until pins 184 align with slots 186, as shown in FIGS. 2 and 5. When pins 184 are aligned with slots 186, the resistance on pins 184 due to the upper portion of groove 190 is removed, allowing spring 108 to expand against head 115 of cage 114, thereby causing cage 114 to move axially against nipple 170 toward end 111 so that pins 184 move axially within slots 186 to about the position shown in FIGS. 2 and 5 and so that seal 122 is biased into sealing contact with tapered surface 150 of seat 112 by spring 108.

Note that moving a nipple 170 to the position of FIG. 2 such that cage 114 is no longer biased against the nipple 170 restores the unidirectional functionality to check valve 100. That is, when the nipple 170 is positioned in the position shown in FIGS. 2 and 5, check valve 100 is configured in its CLOSED configuration. The nipple may be subsequently removed from housing 102 by pulling nipple 170 axially through opening 110. Note that when the nipple 170 is removed from housing 102, check valve 100 remains in its CLOSED configuration.

The sealing contact between seat 112 and seal 122 fluidly decouples opening 126 and thus any fluid-handling components upstream of opening 126 from opening 174' or opening 174" and prevents fluid flow through check valve 100 in the direction from end 128 to end 111. In this way, check valve 100 acts as a shut-off valve for the fluid-handling components upstream of opening 126 for flows in the direction from end 128 to end 111. For one embodiment, a system of fluid-handling components may have several branches connected to a single fluid, e.g., water, supply, with each branch having a check valve 100 configured in its OPEN configuration. In such a system, an individual branch can be shut off by shutting off the check valve 100 for that branch, in the manner described above, without having to shut off the fluid supply to the other branches.

For another embodiment, a check valve 100 may be part of a subterranean fluid handling system, with a nipple 170 being connected, for example, to a pipe that extends above ground level. For this embodiment, the pipe can be used to rotate nipple 170 to close check valve 100, in the manner described above, from above ground level, thereby avoiding the need to access check valve 100, e.g., by digging below ground level. Moreover, for embodiments having a number of subterranean branches coupled to a single fluid supply, with each branch having a subterranean check valve 100 connected to a pipe that extends above ground, an individual branch can be shut off by shutting off the check valve 100 for that branch, in the manner described above, from above ground using the pipe without having to shut off the fluid supply to the other branches and without having to dig down to that check valve 100.

For another embodiment, a check valve 100 can be unthreaded from a fluid-handling component upstream of opening 126 by unthreading threaded opening 178 (FIG. 2) or threaded opening 180 of bushing 176 (FIG. 2) from that fluid-handling components as follows: Starting with a nipple 170 inserted into opening 110 at end 111 of housing 102, pins 184 located in slots 186, and end 185 of the nipple 170 engaging an upper surface of head 115 of cage 114, as shown in FIGS. 2 and 5, the nipple 170 is moved axially into housing 102 against the force of spring 108 until pins 184 engage the bottom 188 of slots 186. With pins 184 in engagement with the bottom 188 of slots 186, spring 108 compressed between the underside of head 115 and the upper surface 113 of seat 112 and seal 122 separated from seat 112, as shown in FIG. 3.

Figure 7:
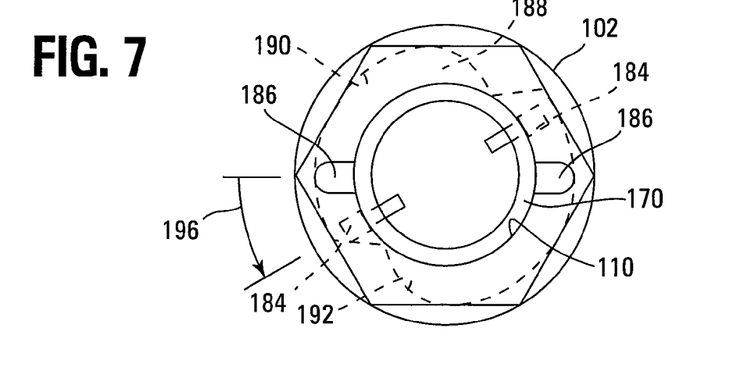
FIG. 7 is top view, corresponding to the top view of FIG. 5, illustrating a rotation of a nipple of a check valve in a second direction, according to another embodiment of the disclosure.

After pins 184 engage bottom 188, nipple 170 is rotated, e.g., in a counterclockwise angular direction within opening 110, as indicated by arrow 196 in the top view of FIG. 7, which corresponds to the top views of FIGS. 5 and 6. Rotating nipple 170 causes pins 184 to move, e.g., slide, within groove 190 relative to housing 102 until at least one of pins 184 engages a stop, e.g., stop 192, as shown in FIG. 7, thereby preventing further rotation in the angular direction indicated by arrow 194. Note that pins 184 are shown by dashed lines in FIG. 7 to indicate that pins 184 are contained in groove 190 and are located below the surface of end 111 (FIG. 3). Note that when a pin 184 is in engagement with stop 192, check valve 100 is in the OPEN configuration of FIG. 3. For another embodiment, a pin 184 engages stop 192 when nipple 170 is rotated by about ¼ of a turn, e.g., about 90 degrees, in the counterclockwise direction from the location where pin 184 is aligned with a slot 186. For one embodiment, this enables any fluid handling system, such as a cattle watering system, connected to check valve 100 to be drained, e.g., for shut-down in winter, without having to disconnect any plumbing of the fluid handling system and without having to rotate nipple 170 by an excessive amount, since check valve 100 is in the OPEN configuration when a pin 184 engages stop 192. Note that for another embodiment, nipple 170 needs to be rotated in the clockwise direction (FIG. 6) over a greater angular distance before a pin 184 engages stop 191 than in the counterclockwise direction before the other pin 184 engages stop 192. For example, the angular distance swept out by a pin 184 in the clockwise direction (indicated by arrow 194 in FIG. 6) between its slot 186 and stop 192 is greater than the angular distance swept out by the other pin 184 in the counterclockwise direction (indicated by arrow 196 in FIG. 7) between its slot 186 and stop 191.

After a pin 184 engages stop 192, continued rotation of the nipple 170 in the counterclockwise direction causes nipple 170 and housing 102 to rotate together as a single unit in the counterclockwise direction, thereby causing either threaded opening 178 or threaded opening 180 of bushing 176 to unthread from the fluid-handling component upstream of opening 126. Similarly, for another embodiment, after a pin 184 engages stop 191 (FIG. 6), continued rotation of the nipple 170 in the clockwise direction causes nipple 170 and housing 102 to rotate together as a single unit in the clockwise direction, thereby causing either threaded opening 178 or threaded opening 180 of bushing 176 to thread onto the fluid-handling component upstream of opening 126.

Note that for embodiments where a check valve 100 is part of a subterranean fluid handling system, with a nipple 170 being connected to a pipe that extends above ground level, the pipe extending above ground level can be used to unthread either threaded opening 178 or threaded opening 180 of bushing 176 from the fluid-handling component upstream of opening 126 without having to dig down to the check valve 100. For example, the pipe can be used to move nipple 170 axially into housing 102 until pins engage bottom 188 of slots 186 (FIG. 3), to rotate the nipple 170 counterclockwise (FIG. 7) so that pins 184 move angularly within groove 190 with respect to housing 102 until a pin 184 engages stop 192, and then to rotate the nipple 170 and housing 102 together as a single unit in the counterclockwise direction to unthread check valve 100 from the fluid-handling component upstream of opening 126.

In another embodiment, the pipe can be used to move nipple 170 axially into housing 102 until pins engage bottom 188 of slots 186 (FIG. 3), to rotate the nipple 170 clockwise (FIG. 6) so that pins 184 move angularly within groove 190 with respect to housing 102 until a pin 184 engages stop 191, and then to rotate the nipple 170 and housing 102 together as a single unit in the clockwise direction to thread check valve 100 onto the fluid-handling component upstream of opening 126.

CONCLUSION

Although specific embodiments have been illustrated and described herein, it will be appreciated by those of ordinary skill in the art that any arrangement that is calculated to achieve the same purpose may be substituted for the specific embodiments shown. Many adaptations of the embodiments will be apparent to those of ordinary skill in the art. Accordingly, this application is intended to cover any adaptations or variations of the embodiments. It is manifestly intended that the embodiments be limited only by the following claims and equivalents thereof.

What is claimed is:

1. A check valve, comprising:
   a housing;
   a nipple having a first portion that is selectively positionable within an opening in the housing, wherein a second portion of the nipple extends from the housing when the first portion of the nipple is selectively positioned within the opening in the housing; and
   a seal movably disposed within the housing;
   a cage connected to the seal; and
   a spring surrounding a first portion of the cage and located between a seat and a second portion of the cage;
   wherein the spring biases the seal against the seat when the first portion of the nipple is removed from the housing;
   wherein the first portion of the nipple bears against the second portion of the cage when the first portion of the nipple is selectively positioned within the opening in the housing so that the spring is between the first portion of the nipple and the seat;
   wherein the check valve is configured to allow fluid flow through the check valve in either a first direction or a second direction when the first portion of the nipple is selectively positioned within the opening in the housing;
   wherein the check valve is configured to prevent fluid flow through the check valve in the first direction when the first portion of the nipple is removed from the housing;
   wherein the housing comprises a stop that extends, in a direction toward the opening, into a circumferential groove formed only in an interior wall of the housing; and
   wherein one or more pins that protrude from an exterior of the first portion of the nipple are configured to move circumferentially within the groove in response to the nipple being rotated.

2. The check valve of claim 1, wherein when the first portion of the nipple is removed from the housing, the check valve is further configured to allow fluid flow in the second direction when a pressure differential between ends of the check valve exceeds a biasing force that acts to prevent the fluid flow in the first direction.

3. The check valve of claim 1, wherein when the first portion of the nipple is removed from the housing, the seal is biased against a seat within the housing so as to prevent the fluid flow through the check valve in the first direction and so as to allow fluid flow through the check valve in the second direction when a pressure differential between ends of the check valve exceeds a force biasing the seal against the seat.

4. The check valve of claim 3, wherein when the first portion of the nipple is selectively positioned within the opening in the housing, the first portion of the nipple prevents the seal from being biased against the seat so as to allow the fluid flow through the check valve in either the first direction or the second direction.

5. The check valve of claim 1, wherein one of the one or more pins is in engagement with the stop within the circumferential groove when the first portion of the nipple is selectively positioned within the opening in the housing.

6. The check valve of claim 1, wherein the nipple is either a first or a second nipple, wherein the first and second portions of the first nipple are substantially the same size, wherein the first portions of the first and second nipple are substantially the same size, and wherein the second portion of the second nipple is smaller than the first portion of the second nipple and the first and second portions of the first nipple.

7. The check valve of claim 6, wherein the second portions of the first and second nipples are externally threaded adjacent their ends, wherein a thread diameter of the external threads of the second portion of the second nipple is smaller than a thread diameter of the external threads of the second portion of the first nipple.

8. The check valve of claim 7, wherein the first portions of the first and second nipples are unthreaded.

9. The check valve of claim 7, wherein when the nipple is the first nipple, internal threads of an internally threaded opening at a first end of the housing opposite a second end of the housing from which the second portion of the first nipple extends match the external threads of the second portion of the first nipple.

10. The check valve of claim 7, wherein when the nipple is the second nipple, a reducing bushing is threaded into an internally threaded opening at a first end of the housing opposite a second end of the housing from which the second portion of the second nipple extends, and wherein internal threads of an internally threaded opening in the reducing bushing match the external threads of the second portion of the second nipple.

11. The check valve of claim 10 further comprises one or more fasteners in engagement with the reducing bushing.

12. The check valve of claim 1, wherein an exterior of the first portion of the nipple is in sealing engagement with a seal disposed in the housing when the first portion of the nipple is selectively positioned within the opening in the housing.

13. The check valve of claim 1, wherein a portion of the housing forms a first axial boundary of the circumferential groove and another portion of the housing forms a second axial boundary of the circumferential groove and wherein the one or more pins that protrude from the exterior of the first portion of the nipple are between the first and second axial boundaries when the one or more pins that protrude from the exterior of the first portion of the nipple move circumferentially within the groove in response to the nipple being rotated.

14. The check valve of claim 1, wherein the one or more pins that protrude from the exterior of the first portion of the nipple are configured to be received in one or more slots in communication with the circumferential groove, wherein the stop is a first stop, wherein the housing comprises a second stop that extends into the circumferential groove in the direction toward the opening, wherein the first stop is located at a first angular distance in a clockwise direction along a circumference of the circumferential groove from one of the one or more slots and the second stop is located at a second angular distance different than the first angular distance in a counterclockwise direction along the circumference of the circumferential groove from the one of the one or more slots.

15. The check valve of claim 1, wherein the direction toward the opening is a substantially radial direction.

16. The check valve of claim 1, wherein the cage has a threaded opening, the check valve further comprising:
a threaded fastener, having a cap, the threaded fastener connecting the seal to the cage, the threaded fastener extending through a fastener seal, a fastener washer, and a center of the seal, wherein the spring is compressed when the threaded fastener is threaded into the threaded opening of the seal.

17. A check valve, comprising:
a housing having a first opening in a first end thereof and a second opening in a second end thereof, the first opening having one or more slots extending radially therefrom and extending axially from the first end into an interior of the housing, the one or more slots in communication with a circumferential groove formed in the interior of the housing, the housing comprising first and second stops that extend into the circumferential groove in a direction toward the first opening;
a seal biased in sealing contact with a seat in the interior of the housing by a biasing force exerted on a cage that is connected to the seal;
a nipple configured to be selectively installed in the first opening of the housing; and
a spring that exerts the biasing force on the cage, wherein the cage comprises a first portion that is located within a bore of the spring and a second portion having a first surface that abuts an end of the spring and a second surface opposite the first surface that the first end of the nipple bears against when the nipple is installed in the first opening of the housing, wherein an opposite end of the spring abuts the seat so that the spring is between the seat and the first surface of the second portion of the cage and such that the spring is between the first end of the nipple and the seat when the nipple is installed in the first opening of the housing;
wherein the nipple has one or more pins extending from an exterior surface thereof so that when the nipple is installed in the first opening of the housing, the nipple passes through the first opening and the one or more pins are received within the circumferential groove respectively through the one or more slots;
wherein when the nipple is installed in the first opening of the housing, a first end of the nipple bears against the cage so as to hold the seal out of sealing contact with the seat, thereby fluidly coupling the second opening to an opening in a second end of the nipple that is located exteriorly of the housing; and
wherein the first stop is located in a first nipple-locking position at a first angular distance in a clockwise direction along a circumference of the circumferential groove from one of the one or more slots and the second stop is located in a second nipple-locking position at a second angular distance different than the first angular distance in a counterclockwise direction along the circumference of the circumferential groove from the one of the one or more slots.

18. The check valve of claim 17, wherein a first portion of the nipple that is located within the housing is unthreaded and a second portion of the nipple that extends exteriorly of the housing is externally threaded.

19. The check valve of claim 18, wherein the first portion of the nipple has a larger diameter than the second portion.

20. The check valve of claim 19 further comprising a reducing bushing threaded into the second opening of the housing, wherein internal threads of the reducing bushing match the external threads of the second portion of the nipple.

21. The check valve of claim 18, wherein the second opening of the housing is internally threaded with threads that match the external threads of the second portion of the nipple.

22. The check valve of claim 17, wherein the direction toward the first opening is a substantially radial direction.

23. The check valve of claim 17, wherein the second angular distance is less than the first angular distance.

24. A check valve, comprising:
a housing;
a nipple having a first portion that is selectively positionable within an opening in the housing, wherein a second portion of the nipple extends from the housing when the first portion of the nipple is selectively positioned within the opening in the housing; and
a seal movably disposed within the housing;
a cage connected to the seal; and
a spring surrounding a first portion of the cage and located between a seat and a second portion of the cage;
wherein the spring biases the seal against the seat when the first portion of the nipple is removed from the housing;
wherein the first portion of the nipple bears against the second portion of the cage when the first portion of the nipple is selectively positioned within the opening in the housing so that the spring is between the first portion of the nipple and the seat;
wherein the check valve is configured to allow fluid flow through the check valve in either a first direction or a second direction when the first portion of the nipple is selectively positioned within the opening in the housing;
wherein the check valve is configured to prevent fluid flow through the check valve in the first direction when the first portion of the nipple is removed from the housing;
wherein the housing comprises one or more slots in the opening in the housing, the one or more slots extending axially from a first end of the housing into an interior of the housing to a circumferential groove formed on an interior wall of the housing, the circumferential groove having two stops, each stop extending in a direction toward the opening within the circumferential groove, each stop locking the nipple in the housing, the first stop positioned a first angular clockwise distance within the circumferential groove from the one or more slots, the second stop positioned a second angular counterclockwise distance within the circumferential groove from the one or more slots; and
wherein one or more pins that protrude from an exterior of the first portion of the nipple are configured to move circumferentially within the groove in response to the nipple being rotated.

25. The check valve of claim 24, wherein the cage has a threaded opening, the check valve further comprising:
a threaded fastener, having a cap, the threaded fastener connecting the seal to the cage, the threaded fastener extending through a fastener seal, a fastener washer, and a center of the seal, wherein the spring is compressed when the threaded fastener is threaded into the threaded opening of the seal.

\* \* \* \* \*